(12) United States Patent
Chen et al.

(10) Patent No.: US 6,880,024 B2
(45) Date of Patent: Apr. 12, 2005

(54) CONTROL SYSTEM FOR MEMORY STORAGE DEVICE HAVING TWO DIFFERENT INTERFACES

(75) Inventors: Li-Pai Chen, Taipei (TW); Yi-Hsiang Huang, Hsinchu Hsien (TW); Chien-An Chen, Hsinchu Hsien (TW)

(73) Assignees: Phison Electronics Corp., Hsinchu Hsien (TW); A-Data Technology Co., Ltd., Taipei Hsien (TW)

(*) Notice: Subject to any disclaimer, the term of this patent is extended or adjusted under 35 U.S.C. 154(b) by 0 days.

(21) Appl. No.: 10/459,588

(22) Filed: Jun. 12, 2003

(65) Prior Publication Data

US 2004/0255064 A1 Dec. 16, 2004

(51) Int. Cl.[7] .............................................. G06F 13/38
(52) U.S. Cl. ............................ 710/62; 710/8; 710/14; 710/15; 710/17; 710/104; 710/301
(58) Field of Search ................... 710/8, 62, 64, 710/14, 15, 17, 104, 301

(56) References Cited

U.S. PATENT DOCUMENTS 6,560,099 B1 * 5/2003 Chang ........................ 361/685
2003/0172209 A1 * 9/2003 Liu et al. ...................... 710/62
2003/0233507 A1 * 12/2003 Yu et al. ..................... 710/310
2004/0029407 A1 * 2/2004 Liu et al. ...................... 439/64
2004/0103328 A1 * 5/2004 Ichien et al. ................ 713/300
2004/0114452 A1 * 6/2004 Liu et al. .................... 365/232

* cited by examiner

*Primary Examiner*—Kim Huynh
*Assistant Examiner*—Justin Knapp
(74) *Attorney, Agent, or Firm*—Bacon & Thomas, PLLC

(57) ABSTRACT

An application IC that can be applied in the control system of a memory storage device for the USB device for communicating with a server for receiving, reading and writing commands from the server and to access to the data stored in various memory storage devices is provided. Alternatively, the application IC can support the server, including IDE portable information product for data transmission. The data transmission having these two different specifications can share the same data source in certain mechanism. In this mechanism, the USB server is in the first priority transfer mode, the IDE server will take action only when the USB server is unavailable or discharged. When the IDE server is in operation mode, the interruption demand from the USB server is denied and after the IDE server completes the assignment, the interruption command from the USB server is executed.

3 Claims, 7 Drawing Sheets

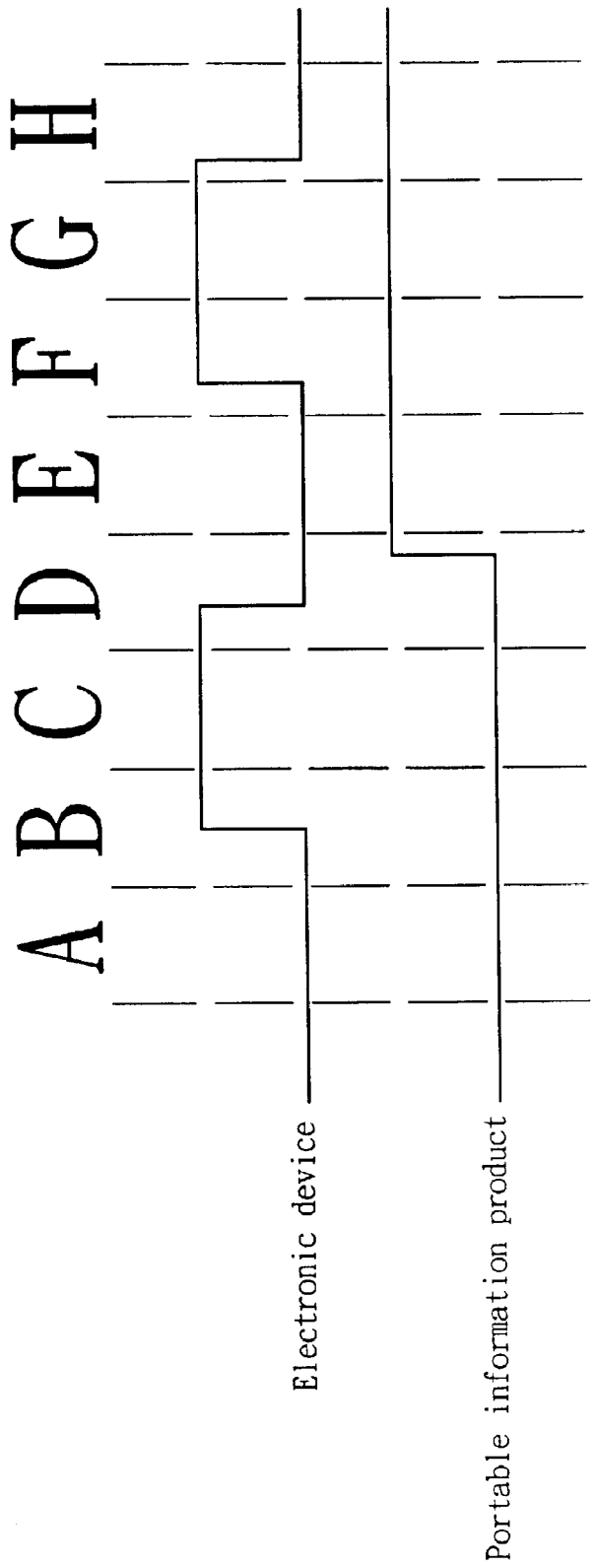

FIG. 4

A: IDE portable information product not available USB electronic device not available
B: IDE portable information product not available USB plus-in electronic device
C: IDE portable information product not available USB electronic device available
D: IDE portable information product not available USB electronic device disconnected
E: IDE portable information product available USB electronic device not available
F: IDE portable information product available USB plus-in electronic device
G: IDE portable information product available USB electronic device available
H: IDE portable information product available USB electronic device disconnected

2

CONTROL SYSTEM FOR MEMORY STORAGE DEVICE HAVING TWO DIFFERENT INTERFACES

BACKGROUND OF THE INVENTION

1. The Field of the Invention

The present invention relates to a control system for memory storage device having two different interfaces, and more particularly relates to an application of IC of the control system which provides an IDE interface and an USB interface that are capable of cooperating to function at the same time.

2. Description of the Related Art

The flash memory is designed to provide features such as erasable, programmable and non-volatile, thus it provides a suitable medium for a general portable memory storage device. The general portable memory storage device (memory chip) available in the market includes Secure Digital, Multi Media Card, Memory Stick, Compact Flash, Smart Media and so on. There is no unified interface for communicating with a server for these storage devices, and therefore a control system of the memory storage device is demanded for communicating with the server. The so-called control system for memory storage device is, for example, flash memory card reader that is capable of communicating with a server (such as computer) for receiving the command from the server to manage, erase, save and retrieve the data from the memory card.

The transmission interface available for memory storage device is generally classified into two major types, namely parallel type and serial type. The parallel type, such as Parallel Port, IDE, PCMCIA and alike, have the advantage of high transmission speed, however, the transmission wires required for this type is plenty so the cost is correspondingly higher; and the serial type, such as Serial Port, USB, IEEE1394 and alike, have lower transmission speed. The most commonly used transmission interface is IDE because IDE has high transmission speed, easy to install, advanced technology and so on. Generally IDE is used in vast storage device, for example, for data saving and retrieving traffic between the server and hard disc driver, or between the server and the CD ROM. Furthermore, USB is currently a popular serial transmission interface, and the advantage provided by USB is due to its capability to receive a plurality of USB devices and supply HOT SWAP and PLUG & PLAY features, and because of such popular features, USB is generally used as computer peripheral product.

Additionally, the HOT SWAP and PLUG & PLAY features makes USB interface as a first choice transmission interface for electronic devices such as application IC of the control system for memory storage device, such as memory card reader. There are several portable information products available in the market that use IDE interface, such as DVD player, and the specification is different compared to USB interface, and therefore there is a barrier in designing that needs a break-through, for instance, the palm DVD uses IDE as transmission interface for memory storage device, for having the function of memory card reading. Accordingly, an interface converting mechanism is required for converting USB interface into IDE interface.

Referring to FIG. 1, illustrates a conventional data transmission process, the common method of converting USB interface into the IDE interface is to install a USB/IDE interface converting circuit 11 within the control system 10 of a memory storage device such as memory card reader to enable the control system 10 of the memory storage device to transmit data through a memory interface 13 to the application IC 14. When the memory chip is installed into the memory chip slot 12 of the control system 10 of the memory storage device, and after processing by the application IC 14, the data is transmitted to an USB/IDE interface converting circuit 11 through the USB interface 15. Furthermore, the data format is converted into IDE interface from USB interface by the USB/IDE interface converting circuit 11 then transmitted to the server, and then the data is stored in the IDE formation and finally transmitted to a portable information product 16. Such a processing procedure for the product design is inefficient and expensive, such procedures bound to suffer from the defects and high power consumption.

SUMMARY OF THE INVENTION

Accordingly, in the view of the foregoing, the present inventor makes a detailed study of related art to evaluate and consider, and uses years of accumulated experience in this field, and through several experiments, to create a new controller system for a memory storage device having two different interfaces in order to effectively eliminate the problems of the prior art. The present invention provides controller system for a memory storage device having two different interfaces.

According to one aspect of the present invention, an application IC that can be applied in the control system of a memory storage device for the USB device for communicating with a server for receiving, reading and writing commands from the server and to access to the data stored in various memory storage devices is provided. Alternatively, the application IC can support the server, including IDE portable information product for data transmission. The data transmission having these two different specifications can share the same data source in certain mechanism. In this mechanism, the USB server is in the first priority transfer mode, the IDE server will take action only when the USB server is unavailable or discharged. When the IDE server is in operation mode, the interruption demand from the USB server is denied and after the IDE server completes the assignment, the interruption command from the USB server is executed.

According to another aspect of the present invention, an application IC that can be applied in the control system of the memory storage device is provided. The application chip comprises a CPU, a buffer, a read only memory, a power circuit, a plurality of various memory card interfaces, an IDE interface and a USB interface, wherein the application IC is connected to the USB server through the USB interface, and the application IC also connected to the portable information product through the IDE interface. The USB server communicates with the CPU of the application IC to retrieve or store the data from the memory card that is connected to the memory card interface. Additionally, when the USB server stops operation, the information product communicates with the CPU of the application IC to retrieve or store the data from the memory card that is connected to the memory card interface. Thus the control system for memory storage device of the present invention not only meets the requirement of the IDE portable information product but also have features of the USB device.

BRIEF DESCRIPTION OF THE DRAWINGS

For a more complete understanding of the present invention, reference will now be made to the following detailed description of preferred embodiments taken in conjunction with the accompanying drawings, in which:

FIG. 4 is a flowchart illustrating the processing of the application IC of the present invention between the USB and IDE servers;

DETAILED DESCRIPTION OF PREFERRED EMBODIMENTS

Figure 1:
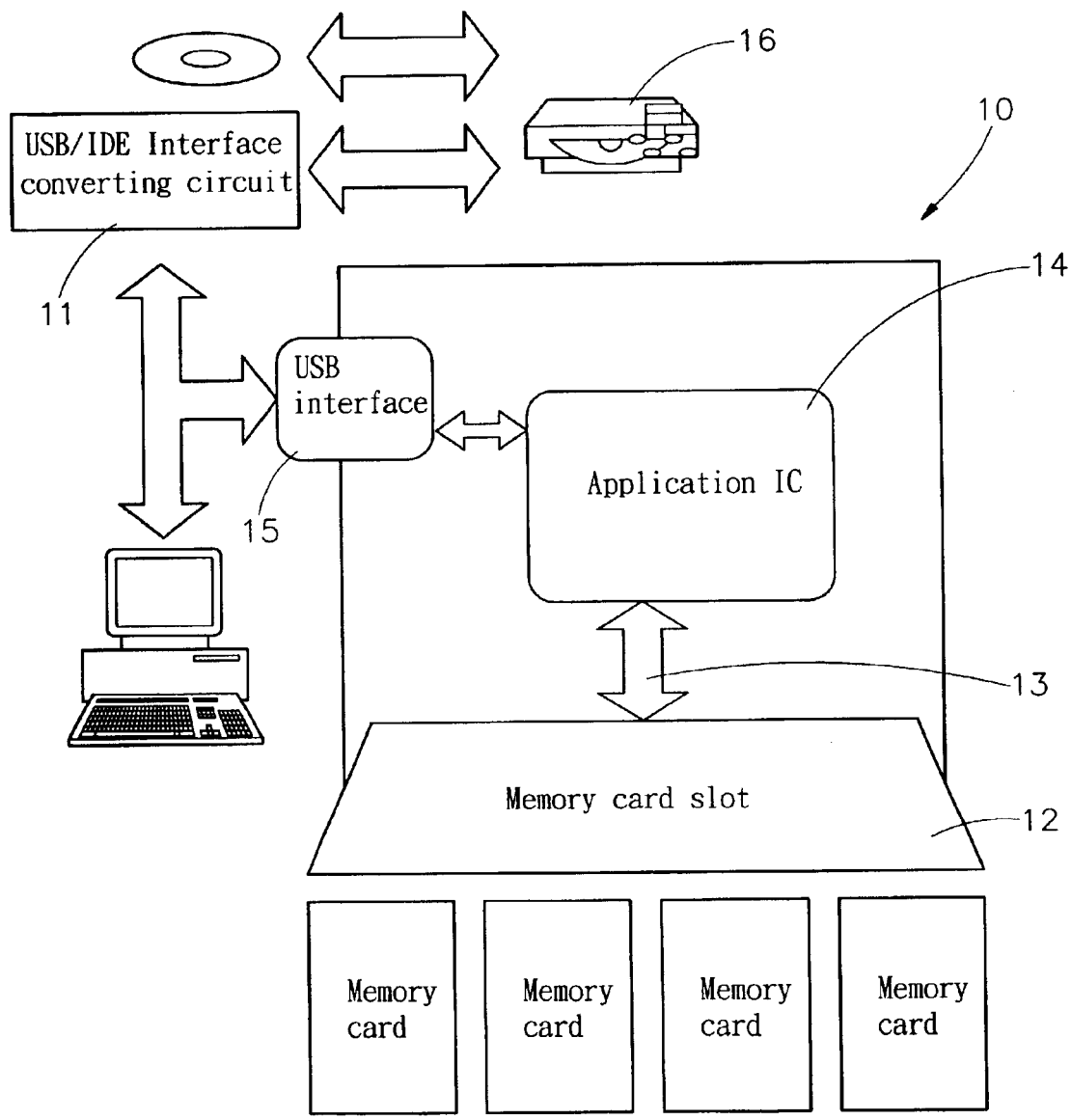
FIG. 1 is a flowchart illustrating a conventional process of a data flow conventional between the USB device and the parallel port.

Reference will be made in detail to the preferred embodiments of the invention, examples of which are illustrated in the accompanying drawings. Wherever possible, the same reference numbers are used in the drawings and the description to refer to the same or like parts.

Figure 2:
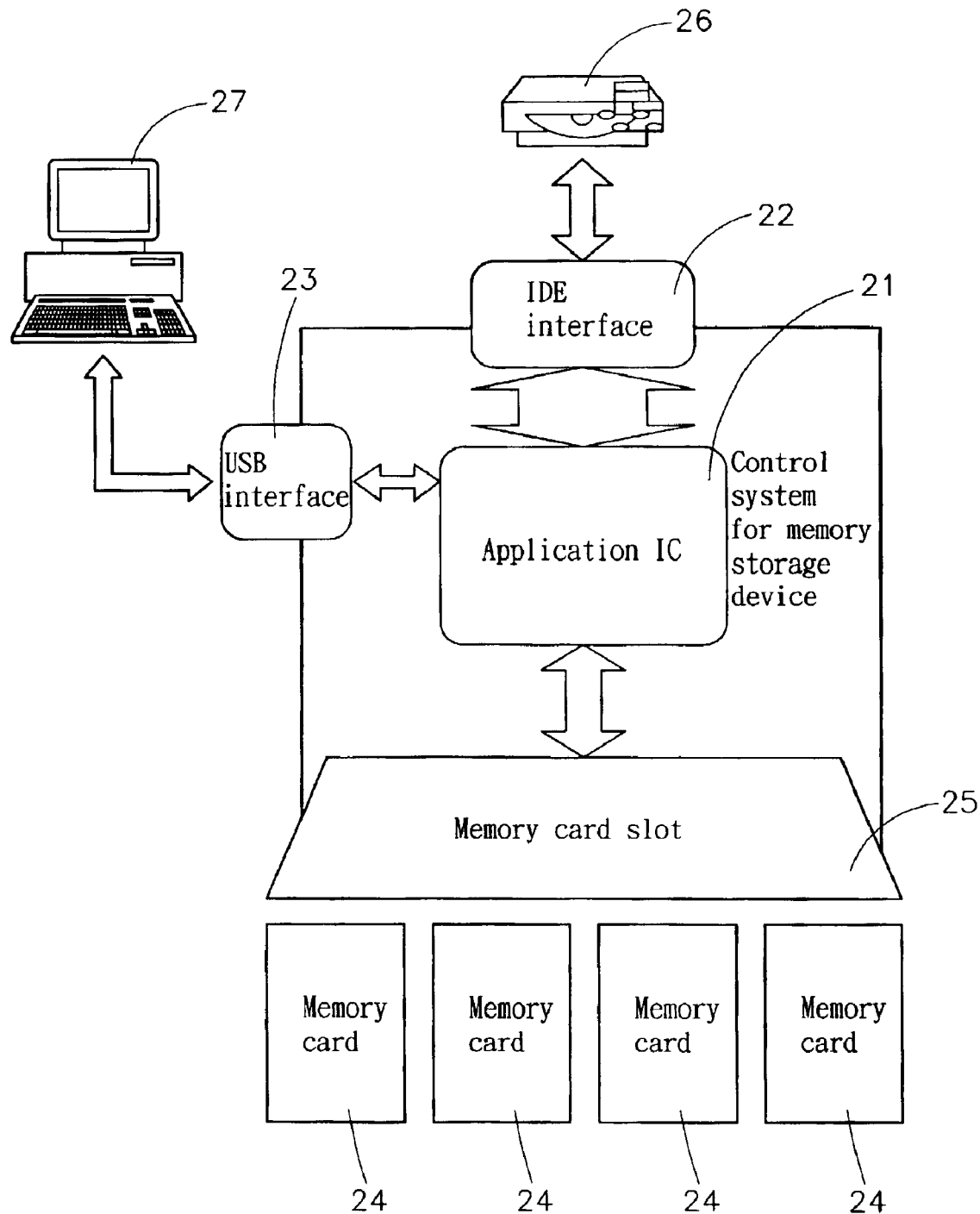
FIG. 2 is a flowchart illustrating a process of a data flow between the USB device and the parallel port using the application IC according to a preferred embodiment of the invention.

Referring to FIG. 2, the application IC 21 comprises an IDE interface 22 and an USB interface 23. The application IC 21 of the control system for memory storage device has a capability to connect and communicate directly with the portable information product 26 through an IDE port by installing an additional IDE server end interface. After the memory card 24 is installed into the memory card slot 25, the data stored in the memory card 24 can be transmitted to the application IC 21 through the memory card slot 25 and processed by the application IC 21. Further, the above data can be transmitted to the portable information product 26 that is connected through the IDE port without affecting the USB server, thus the IDE portable information product 26 is able to retrieve the data from the memory card 24 or store the data into the memory card 24.

The control system for memory storage device comprises an original USB interface 23 for connecting with an electronic device 27 such as a computer having an USB specification to transmit the data to the memory card 24 through the original route, wherein the memory card 24 is inserted into the memory card slot 25. The data stored in the memory card 24 can also be transmitted to the application IC 21 through the memory card slot 25 and then processed by the application IC 21. Further, the above data is transmitted to the electronic device 27. The electronic device 27 is enabled to retrieve the data from the memory card 24 or store the data into the memory card 24.

Figure 3:
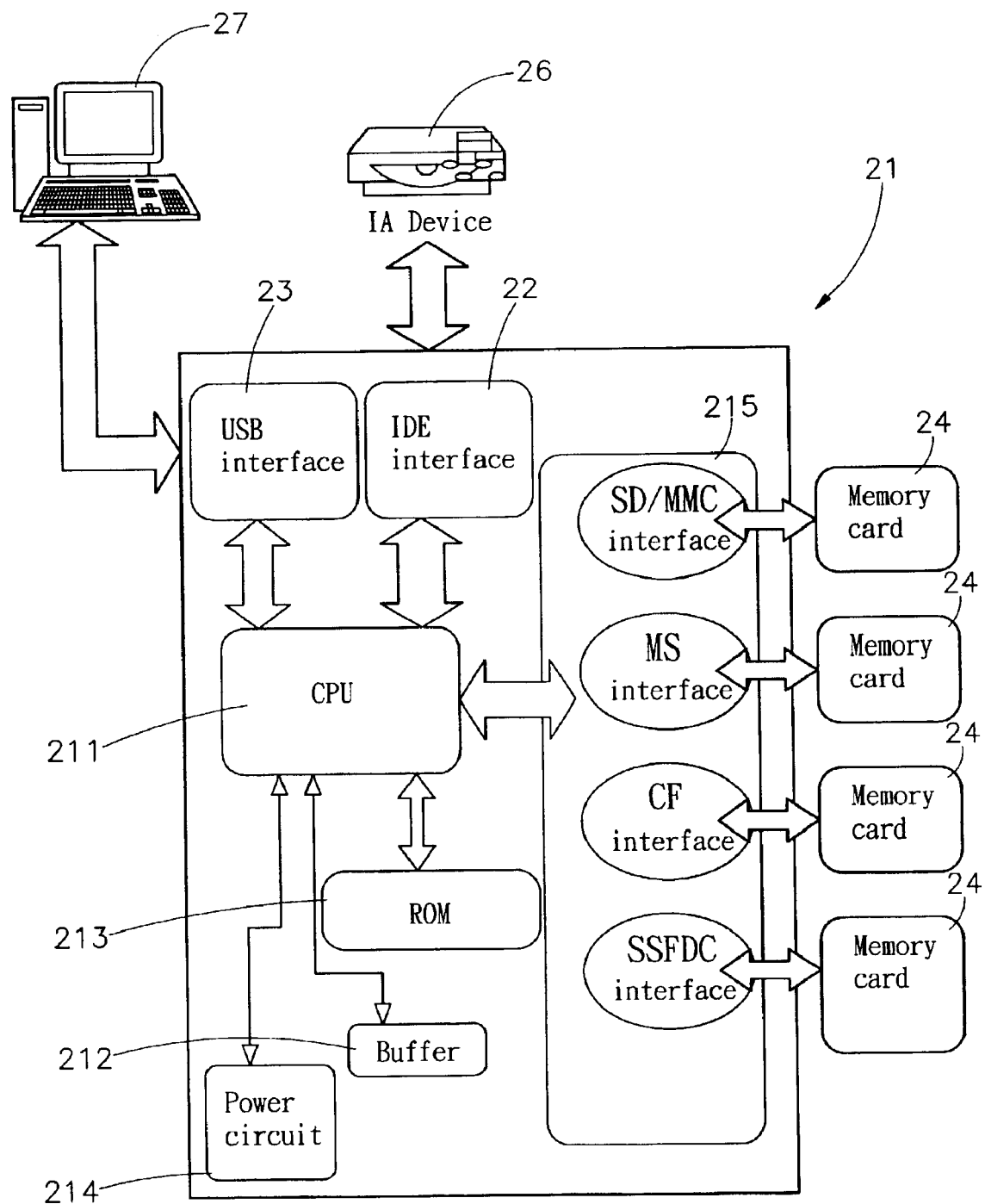
FIG. 3 is a flowchart illustrating the operation process of the application IC of the present invention.

Now, referring to FIG. 3, the application IC 21 comprises a CPU 211, a buffer 212, a read only memory (ROM) 213, a power circuit 214 and a plurality of various memory cards (such as SECURE DIGITAL™ (SD), MULTIMEDIA CARD™ (MMC), MEMORY STICK™, COMPACT FLASH™, SMART MEDIA™ and other memory cards) interfaces 215 to enable the application IC 21 for not only connecting with the USB electronic device 27 through the USB interface 23 but also for connecting with the IDE portable information product 26 through the IDE interface 22 directly. Thus the USB electronic device 27 can control the CPU 211 of the application IC 21 and retrieve or store data from or into the memory card 24 that is connected to the memory card interfaces 215. On the contrary, when the USB electronic device 27 stops the operation, the IDE portable information product 26 will control the CPU 211 of the application IC 21 and can retrieve or store data from or into the memory card 24 that is connected to the memory card interfaces 215.

In one preferred embodiment of the present invention, the IDE interface 22 do not have the functions of Plug & Play and Hot Swap, and therefore the present invention proposes to use an USB interface 23 as the priority transmission mode only when the USB interface 23 stops operation or the USB electronic device 27 is not available, the IDE interface 22 is able to execute these functions. Meanwhile, the IDE portable information product 26 that is connected to the IDE interface 22 will deny any interruption command from the USB electronic device 27 that is connected with the USB interface 23. However, once the IDE portable information product 26 completes the operation, the interruption command of the USB transmission mode will be executed immediately.

Referring to FIG. 4, illustrating the processing of the application IC of the present invention between the USB and IDE servers, wherein the higher level represents the existence of the server, which connects to the memory storage device, and the lower level represents the inexistence of the server. The first row in the chart indicates the status of the USB electronic device 27, and the second row indicates the status of the IDE portable information product 26. The corresponding status between the USB and IDE servers are classified into eight types as described below:

Status A, both the IDE portable information product 26 and the USB electronic device 27 are not available (disconnected from the system), the system remains in non-operational mode.

Status B, the IDE portable information product 26 is unavailable but the USB electronic device 27 is connected with the system, under this status, the system will start operation in the USB transmission mode.

Status C, the IDE portable information product 26 is unavailable but the USB electronic device 27 is connected with the system, under this status, the system continues to operate in USB transmission mode.

Status D, the IDE portable information product 26 is unavailable and the USB electronic device 27 is disconnected from the system, under this status, the system stops operating in USB transmission mode and restarts the operation as a status A.

Status E, the IDE portable information product 26 is available, for instance being connected to the system, but the USB electronic device 27 is unavailable, for instance, being disconnected from the system, under this status, the system starts operation in the IDE mode.

Status F, the IDE portable information product 26 is available, for instance being connected to the system, but the USB electronic device 27 is connected back to the system, under this status, the system continue to operate in the IDE mode, and when the IDE portable information product 26 completes operation, the system starts operation in the USB mode.

Status G, the IDE portable information product 26 is available, for instance being connected to the system, but the USB electronic device 27 continued to be connected with the system, under this status, the system continue to operate in the previous mode, i.e., if the previous operation is running the IDE portable information product 26, the system will continue to operate in the IDE mode until the IDE portable information product 26 completes the operation, and then starts to operate in the USB mode.

Status H, the IDE portable information product 26 is available, for instance being connected to the system, but the USB electronic device 27 is unavailable, for instance, being disconnected to the system, the system decides to operate in the USB mode and restarts the operation as a status E.

Figure 5A:
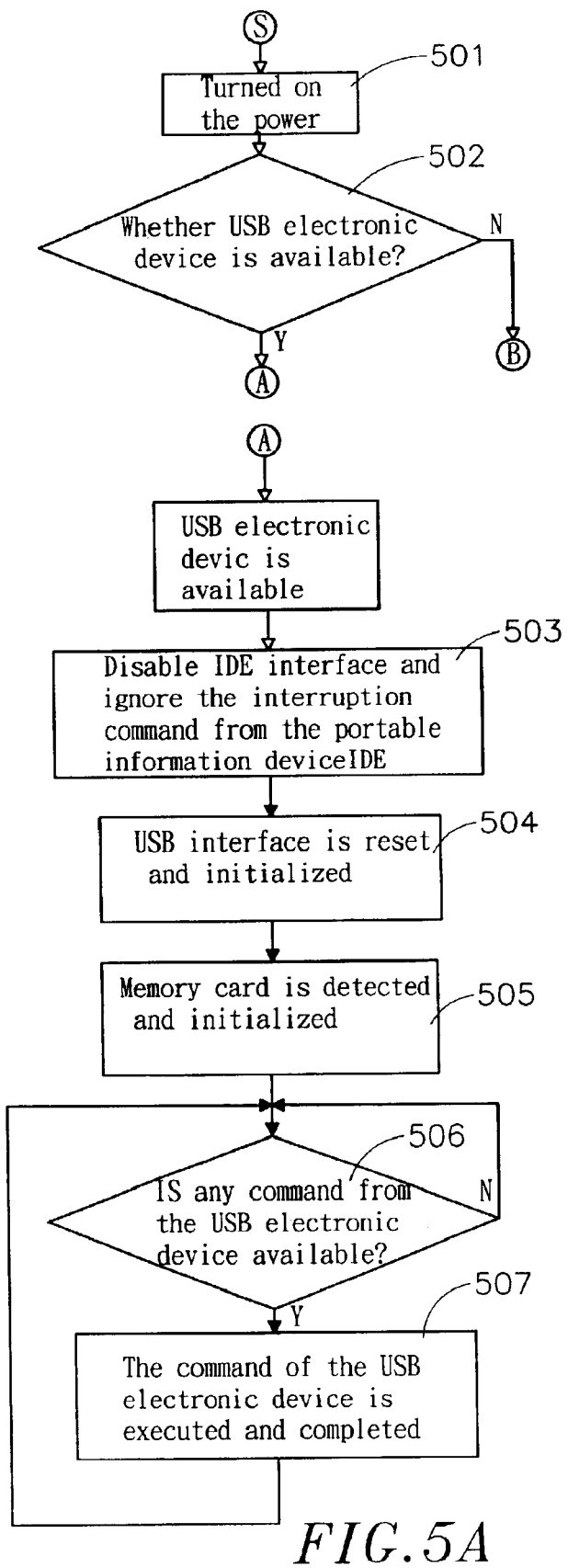
FIG. 5A is a flowchart illustrating the operation process of the application IC according to one preferred embodiment of the present invention (I)

Referring to FIG. 5A, the operation process of the application IC 21 according to one preferred embodiment of the present invention is described as follows:

The operation process begins with step (501)(S) in which the power of the system is turned on, then the process proceeds to step (502). In step (502) whether the USB electronic device 27 is connected to the system is determined, if yes, then the process proceeds to step (A), and if not, then the process proceeds to step (B). Next, in step (503) the IDE interface 22 is disabled to block the operation of the IDE interface 22 for ignoring the interruption command from the IDE portable information product 26. Next, the process proceeds to step (504) in which the USB interface 23 is reset and initialized. Next, the process proceeds to step (505) in which the memory card 24 is detected and initialized. Next, the process proceeds to step (506) which is a judgment step in which any command from the USB electronic device 27 availability is determined, if yes, the process proceeds to step (507), if not the process remains in step (506). Next, the process proceeds to step (507) in which the command of the USB electronic device 27 is executed, and the process returns to step (506) when the command execution is completed.

Figure 5B:
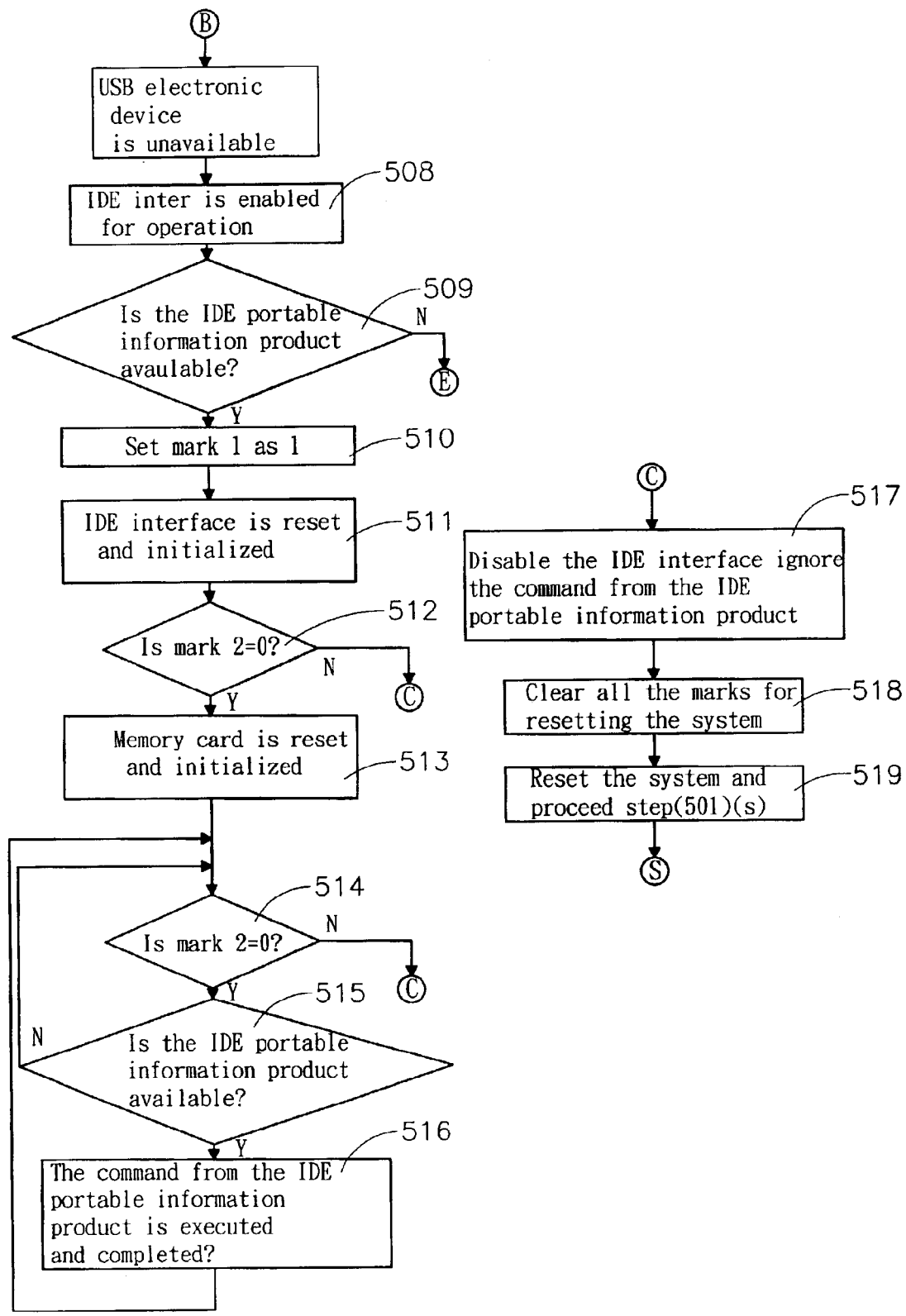
FIG. 5B is a flowchart illustrating the operation process of the application IC according to one preferred embodiment of the present invention (II)

Referring to FIG. 5B, in the above process if the USB electronic device 27 is not available [step (B)], the IDE interface 22 is enabled for operation [step (508)]. Next, the process proceeds to step (509) which is a judgment step in which whether the IDE portable information product 26 is connected to the application IC 21 is detected, if yes, the process proceeds to step (510), and if not the process ends in step (E). In step (510) mark 1 as 1 to indicate that the system is operation in the IDE mode. Then the process proceeds to step (511) in which the IDE interface 22 is reset and initialized. Next, the process proceeds to step (512) in which if a mark 2 indicating an incoming command for interruption from the USB electronic device 27 is set, then the mark 2 is set as 0 and whether the mark 2 is 0 is further determined, if yes, the process proceeds to step (513) or proceeds to step (517)(C). Further, in step (513) the memory card 24 is detected and initialized. The process proceeds to step (514) in which whether the mark 2 is 0 is determined, if yes, the process proceeds to step (515), if not skips to proceeds step (517)(C). In step (515) whether any available command from the IDE portable information product 26 is determined, if yes, the process proceeds to step (516), if not the process returns to step (514) to continue to detect the command from the IDE portable information product 26. In step (516) the command from the IDE portable information product 26 is executed, then the process returns to step (514). Next, the process proceeds to step (517)(C) in which the IDE interface 22 is disabled to ignore the command from the IDE portable information product 26. Next, the process proceeds to step (518) in which all the marks are cleared for resetting the system. Next, in step (519) the system is prepared to restart in the USB mode and proceeds to step (501)(S).

Figure 6:
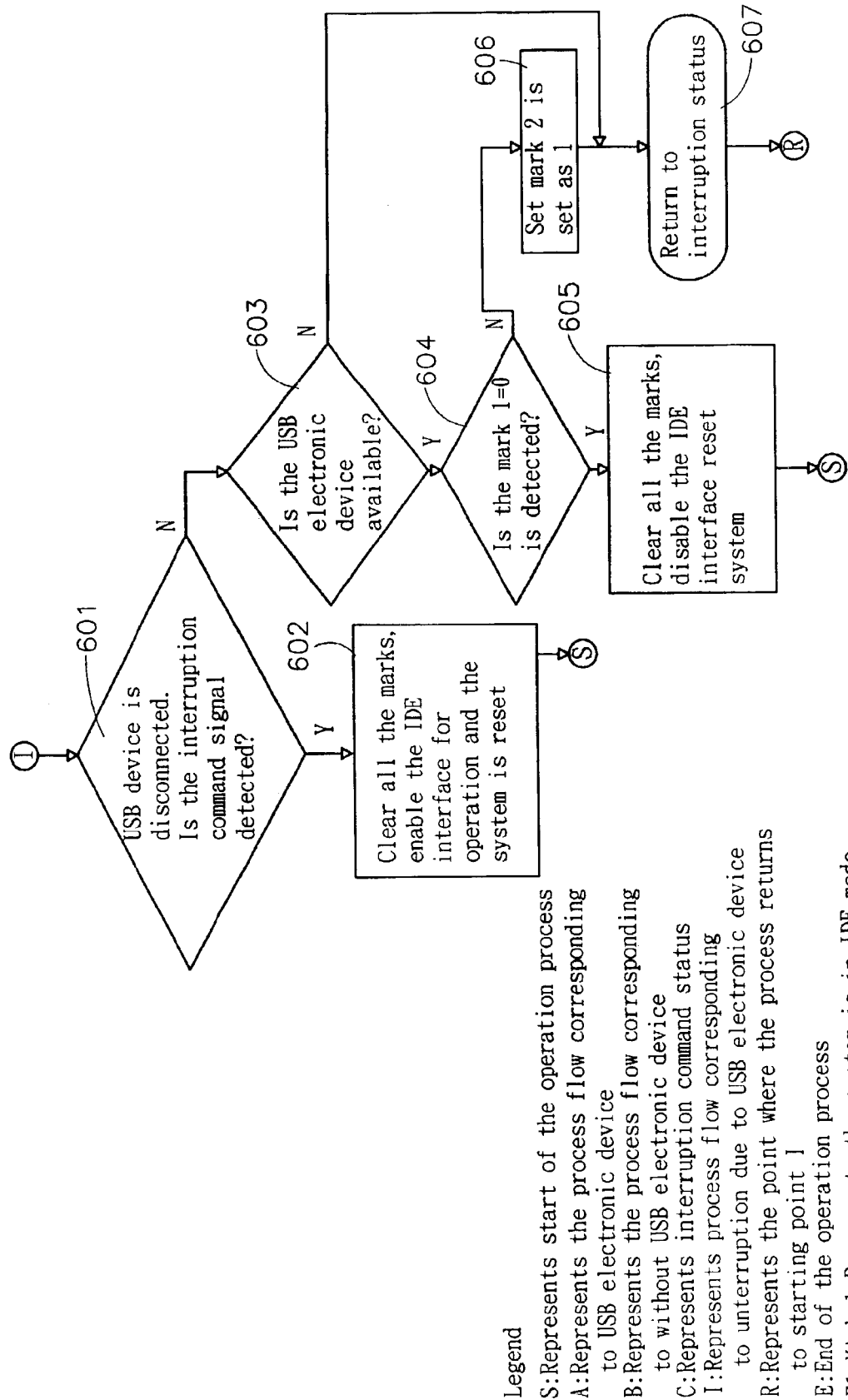
FIG. 6 is a flowchart illustrating the operation process of the application IC according to another preferred embodiment of the present invention.

Additionally, referring to FIG. 6, the operation process of the application IC 21 according to another preferred embodiment of the present invention is described as follows:

The operation process begins with step (601)(I) in which the USB electronic device 27 is disconnected and an interruption signal is detected, if yes, the process proceeds to step (602), if not, the process skips to step (603). In step (602) the IDE interface 22 is enabled for operation and also all the marks are cleared for resetting the system, and then the process proceeds to step (501)(S). Next, in step (603) whether any incoming interruption command for running the USB electronic device 27 is detected, if yes, the process proceeds to step (604), if not the process skips to step (607). In step (604) whether the mark 1 is 0 (mark 1 indicates the system is operating in IDE mode) is detected, if yes, the process proceeds to step (605), if not the process skips to step (606). In step (605) because the system is not operating in the IDE mode, and therefore the IDE interface 22 is enabled for operation and all the marks are cleared for resetting the system, then the system prepares to restart in the USB mode. Next, in step (606) because to the system is operating in the IDE mode, a mark 2 is set as 1 so as to decide whether to carry on in USB mode when the IDE portable information product 26 is connected. Next, in step (607) the interruption process is stopped and then the process returns to step (601)(R).

While the invention has been described in conjunction with a specific best mode, it is to be understood that many alternatives, modifications, and variations will be apparent to those skilled in the art in light of the foregoing description. Accordingly, it is intended to embrace all such alternatives, modifications, and variations in which fall within the spirit and scope of the included claims. All matters set forth herein or shown in the accompanying drawings are to be interpreted in an illustrative and non-limiting sense.

What the invention claimed is:

1. A control system for memory storage device having two different interfaces, comprising:
    an application IC chip comprising an IDE interface, an USB interface, a CPU, a buffer, a ROM, a power circuit and a plurality of memory cards;
    wherein said application IC is capable of connecting to an USB electronic device through said USB interface and also an IDE portable information product through said IDE interface;
    wherein said USB electronic device is capable of communicating with said CPU of said application IC for retrieving information from said memory cards or storing information into said memory cards that are connected with a memory card interface, and when the USB electronic device stops operation, said IDE portable information product is capable of communicating with said CPU of said application IC for retrieving information from said memory cards or storing information into said memory cards that are connected with the memory card interface,
    wherein a USB mode is a priority transmission mode for said application IC, said IDE interface being able to operate only when said USB interface is not operating or unavailable, and when said IDE portable information device that is connected to said IDE interface is operating, the system will deny any interruption from said USB electronic device that is connected to said USB interface, and
    wherein once said IDE portable information product completes an operation, then a interruption command from said USB device can be executed.

2. The control system for memory storage device according to claim 1, wherein at least one of said memory cards includes a flash memory.

3. The control system for memory storage device according to claim 1, wherein said memory card interface is selected from the group consisting of a parallel port interface, an IDE interface, a PCMCIA interface, a serial port, a USB port, and an IEEE1394 port.

* * * * *